(12) United States Patent
Clothier

(10) Patent No.: US 9,024,195 B2
(45) Date of Patent: May 5, 2015

(54) GROMMET

(76) Inventor: Alan Clothier, Bristol Hill (GB)

( * ) Notice: Subject to any disclaimer, the term of this patent is extended or adjusted under 35 U.S.C. 154(b) by 124 days.

(21) Appl. No.: 13/983,700

(22) PCT Filed: Feb. 6, 2012

(86) PCT No.: PCT/GB2012/000115
§ 371 (c)(1),
(2), (4) Date: Oct. 11, 2013

(87) PCT Pub. No.: WO2012/104593
PCT Pub. Date: Aug. 9, 2012

(65) Prior Publication Data
US 2014/0027173 A1    Jan. 30, 2014

(30) Foreign Application Priority Data
Feb. 4, 2011 (GB) .................................. 1101914.8

(51) Int. Cl.
*H02G 3/22* (2006.01)
*H02G 3/06* (2006.01)
*H02G 3/08* (2006.01)

(52) U.S. Cl.
CPC ............... *H02G 3/06* (2013.01); *H02G 3/0691* (2013.01); *H02G 3/083* (2013.01)

(58) Field of Classification Search
USPC .......................................... 248/56; 16/2.1, 2.2
See application file for complete search history.

(56) References Cited

U.S. PATENT DOCUMENTS

| | | | | |
|---|---|---|---|---|
| 5,789,706 A | * | 8/1998 | Perkins | 285/136.1 |
| 6,034,326 A | * | 3/2000 | Jorgensen | 174/660 |
| 6,133,529 A | * | 10/2000 | Gretz | 174/656 |
| 6,604,400 B1 | * | 8/2003 | Gretz | 72/334 |

* cited by examiner

*Primary Examiner* — Dhirubhai R Patel
(74) *Attorney, Agent, or Firm* — William H. Bollman

(57) ABSTRACT

The present invention provides a grommet having a hollow elongate tubular body with two flexible end-faces each having thicker diameter leading edges that precede thinner diameter catchment areas.

19 Claims, 6 Drawing Sheets

GROMMET

FIELD OF THE INVENTION

The present invention relates to a grommet, for example a grommet which provides a conduit for the passage of pipes or cables, more particularly a grommet for use with electrical fittings.

BACKGROUND

As a resulting of increasing numbers of electrical appliances and more particularly electronic devices, in homes and businesses new build properties and refurbished properties or rooms in domestic or commercial properties increasingly require multiple electrical outlets.

Therefore frequently in response to this multiple two-gang sockets will be located in close proximity so that a user does not require additional extension leads or other socket multipliers.

PRIOR ART

Frequently walls for installation of sockets are stud walls constructed with plasterboard and vertical wooden studwork with horizontal battens. In order to install multiple sockets in close proximity it is typical to mount the sockets on battens. The sockets typically comprise metal back boxes which are screwed to the battens. The battens are provided with knock out segments through which wires pass to be connected with a socket fascia.

Therefore in order to surround the fascia the plasterboard is cut to size. The wires then need to be threaded through the knocked out segments, typically through the lowermost edge in order to ensure that it is known where the wires are likely to be for later work. Each of the boxes will need to be attached to the batten typically by screws.

International Patent Application WO 9 937 005 (GRETZ) discloses a snap in locking helical armoured cable connector configured for use with a spring steel adaptor to join to an electrical junction box to fix the location of the locking cable connector with respect to the junction box, the locking cable connector having mating pieces that snap together to provide a connector for helically grooved armoured clad electrical conductors to the electrical junction box comprising: a first piece including a die cast member with a smooth inboard cylindrical section having a diameter to accommodate a spring steel adaptor; and a generally cylindrical spring steel locking ring to receive an armoured cable and lock said cable into said die cast member, said locking ring having a first set of tangs allowing insertion into said die cast member but restricting withdrawal motion from said die cast member and having a second set of cable gripping tangs oppositely directed to receive the armoured cable and restrict its movement in a reverse direction.

U.S. Pat. No. 7,476,817 (SHEMTOV) discloses a cable connector for securing a cable in a wall aperture comprising: an elongate body extending between an insertion end and an opposing receiving end, the body having an outer body surface with an at least substantially circular circumference, and an opposing inner body surface surrounding an inner body passage extending from the insertion end to the receiving end, wherein the body is formed of a series of elongated body sections joined at or adjacent the insertion end and adjacently extending toward the receiving end, with body slots being defined between the adjacent body sections. At least one resiliently flexible elongated leg extends outwardly from the outer body surface, the leg having: a leg base affixed to the body at or adjacent the insertion end, the leg extending therefrom towards the receiving end to terminate in a leg tip. An inner leg surface facing toward the longitudinal axis of the elongated body and an opposing outer leg surface, wherein the outer leg surface includes a leg channel defined therein, the leg channel being oriented at least substantially perpendicular to the longitudinal axis of the elongated body; at least one resiliently flexible elongated prong extending inwardly from the inner body surface, the prong having a prong base affixed to the body at or adjacent the receiving end, the prong extending therefrom towards the insertion end to terminate in a prong tip. A sleeve has an inner sleeve surface surrounding an inner sleeve passage, wherein: the sleeve has sleeve ridges defined along the inner sleeve passage, and the sleeve is fit over the receiving end, with: the receiving end, and at least a portion of the body sections, being fit within the inner sleeve passage with the sleeve ridges being fit within the body slots, whereby: the insertion end of the body may be inserted into a wall aperture within a wall to situate the wall within the leg channel, and a cable may be inserted into the inner body passage at the receiving end of the body to have the prong engage the cable therein.

International Patent Application WO-A-2008/057771 (ARENAS et al) discloses a modular wiring system comprising: a functional unit having a housing; at least one functional interface disposed within said housing; at least one connection element extending out from said housing, said at least one connection element having a first section and a second section wherein said second section forms a locking section; a wiring unit comprising: a housing having at least one opening; and at least one front face forming a connection interface for said locking section of said at least one connection element wherein said wiring unit housing is smaller than said functional unit housing.

U.S. Pat. No. 7,432,452 (GARDNER) discloses a snap-in electrical connector for helical metal cable and conduit comprising: a body having a leading end engageable in a hole of a junction box or the like, a trailing end, and at least one locking ring chamber having a longitudinal axis, a spring steel locking ring in said chamber, said locking ring including outwardly extending locking tabs engaged in holes in said body, and inwardly extending tabs including a trailing tab and a leading tab that extend toward each other and a middle tab between said trailing and leading tabs, each of said tabs having a leg extending inwardly of said chamber toward said leading end, a cable/conduit engaging tip bent at an angle with respect to said leg, and a tip end, said tip ends being spaced along said longitudinal axis of said chamber and being biased relative to said legs in the same direction, whereby the said tips and tip ends capture the helical groove of the cable/conduit when inserted into said body with said chamber.

U.S. Pat. No. 7,338,312 (HERTH) discloses a universal electrical cable and work box connector for use with a thin-walled internal electrical box for snap-in installation or a thick-walled external electrical box for threaded engagement comprising: a front nose section, a rear section having external threads with said rear section tapering inwardly toward a rear end of said work box connector, and a central ridge section between said front and rear sections with grooves separating said central ridge section from said front and rear sections; said work box connector having a central orifice containing an angled wire clamp member; said work box connector having a slot extending the length thereof to allow said connector to be squeezed together for insertion of said front or rear section through an opening in an internal electrical work box, the tapering of said rear section preventing interference from said external threads during an outside-in snap-in installation; and said external threads being adapted to engage threads in an opening of an external electrical work box having internal threads, said slot allowing said work box connector to be squeezed slightly to start engagement of said external and internal threads.

U.S. Pat. No. 7,244,085 (DOBSON) discloses a grommet comprising: a grommet body; a cylindrical extension projecting from said grommet body; an opening extending through said body and said extension; and an outward projection on said extension in spaced relation with said body, defining a washer retention zone between said body and said projection.

None of the above devices provide or suggest a solution to the convenient spacing of electrical boxes to be installed in cavity walls.

SUMMARY OF THE INVENTION

According to the present invention there is provided a grommet having a hollow elongate tubular body with two flexible end-faces each having thicker diameter leading edges that precede thinner diameter catchment areas.

Preferably the flexible end faces are arranged to resiliently engage the periphery of a suitably shaped and dimensioned aperture defined by a surface. The end face preferably provides snap-fit engagement with a periphery of a suitably shaped and dimensioned hole defined by a peripheral edge of a surface.

The catchment areas may be arranged to receive the periphery of a suitably shaped and dimensioned hole provided by a surface of an item. Alternatively, or additionally, a washer may be provided between the grommet and a hole provided by a surface, and as such the catchment area may also be a washer catchment area.

At least one of the flexible end faces may be discontinuous, and may be formed by a plurality of sections. For example the at least one flexible end face may comprise at least one tab, preferably a plurality of tabs. The at least one tab preferably extends longitudinally from the body and may be in the form of elongate finger(s).

Preferably the thicker diameter leading edges of the flexible end faces comprises at least one protrusion. Each flexible end face may comprise one or more protrusions, preferably at least two protrusions, more preferably at least three protrusions, for example four protrusions. The two flexible end faces may both comprise the same number of protrusions, or alternatively one flexible end face may comprise more protrusions than the other flexible end face, depending on the intended use of the grommet.

The protrusions may for example be provided on tabs. Each protrusion may be formed on or defined by a separate tab. The tabs may also provide a recess proximal to the tubular body. The recess may provide the catchment area for receiving a resilient engagement (preferably snap-fit engagement) with the periphery of a hole provided by an item. The catchment area may therefore be formed by a plurality of sections.

The protrusions on a flexible end face of the grommet may be spaced apart circumferentially about the longitudinal axis of the tubular body. Preferably, the protrusions are evenly spaced apart circumferentially about the longitudinal axis of the tubular body so as to provide opposing pairs of protrusions. A flexible end face may provide one or more opposing pair(s) of protrusions, preferably two opposing pairs of protrusions.

The two flexible end faces of the grommet may be identical. Alternatively, one or more of the number and/or shape and/or spacing and/or distribution of protrusions on one of the flexible end faces, may be different to the number and/or shape and/or spacing and/or distribution of protrusions on the other of the flexible end faces.

The protrusions are preferably tapered, having a minimum thickness at the outer edge of the grommet and a maximum thickness at the inward extent of the protrusion. The or each protrusion may optionally finish with a step change in thickness at the catchment area.

The tubular body may be cylindrical. In preferred embodiments it is envisaged that the diameter of the elongate tubular body of the grommet is greater than the diameter of the periphery of the hole provided by the surface of an item. The elongate tubular body of the grommet may extend beyond a maximum diameter of the flexible end faces, for example the leading edges, and catchment areas. In this way once the grommet is installed in and engaged with an item as desired, such as for example a hole provided by a knock out segment of an electrical back box or a panel, the item is not liable to move along the elongate tubular body of the grommet.

The tubular body ideally has a shoulder portion adjacent each flexible end face. The shoulder ideally extends perpendicular to the longitudinal axis of the grommet. The one or more tabs or protrusions may be connected to the tubular body at the shoulder. Each shoulder may provide an alignment surface and is preferably arranged to abut the surface defining and surrounding an aperture or hole. At least one of the shoulder portions, preferably both of the shoulder portions, of the tubular body may have a greater diameter than the maximum diameter of the flexible end face and the hole provided by a surface. Thus, the distance between the shoulder adjacent a first flexible end face and the shoulder adjacent a second flexible end face of the grommet may, in use, provide a predetermined minimal spacing.

The tubular body of the grommet may be formed of the same material as the item, for example the same material as the knock out segment of an electrical back box.

The hollow elongate tubular body may provide a conduit. For example, the body may be arranged to provide a conduit for cables, wires or pipes. The conduit may be any desired shape; preferably the elongate tubular body may provide a cylindrical conduit. The conduit is preferably sized to enable wires to be freely inserted and removed.

Preferably, the conduit of the tubular body does not engage any cables or pipes extending therethrough. The tubular body may provide a conduit having the same or greater internal diameter as the hole provided by the item, for example the knock out section or panel, so as to allow the passage of, for example, wiring as required. Preferably, the tubular body may provide a conduit having the same internal diameter as the hole provided by the item, for example the knock out section.

The grommet may be used to connect at least two items and may provide a conduit for pipes (such as for example water pipes), wires and/or cables between the items. For example, the grommet may be used to connect at least two standard electrical back boxes (eg. standard metal electrical boxes). Alternatively the grommet may be used for panels in a vehicle (for example an aircraft).

The grommet may be dimensioned and arranged to set a predetermined spacing between items. For example the grommet may be used to evenly space apart items. The grommet may be arranged to space apart electrical back boxes or panels in a vehicle (for example an aircraft). This allows multiple numbers of items, such as for example sockets or panels, to be precisely aligned, spaced apart and assembled prior to being attached to their desired location, such as for example on a wall, backing board or on a vehicle.

The grommet may also act as an insulator. Preferably, at least a part of the grommet may be formed from an electrically insulating material, such as for example a synthetic plastics. As a result, the grommet may be used to enclose wires without requiring double insulation around the wires. This has the advantage that the grommet may accommodate an increased number of single wires extending through the conduit provided by the elongate tubular body.

Use of the grommet also eliminates the need for more specialist 1+1 and 2+1 gang boxes. As a result, a user only now needs to install standard single and double back boxes. Use of the grommet therefore makes the installation of items; such as for example electrical back boxes less time consuming, more cost effective and safer.

It is known that items, such as for example electrical back boxes are manufactured to include a number of knock out segments, typically circular in shape, which can be removed in use to provide an opening for electrical cables to pass through. Items such as panels for a vehicle (such example an aircraft or car) may be manufactured with holes in the desired location for electrical cables to pass through.

The grommet may, for example, be dimensioned and shaped so that in use a flexible end face of the grommet forms a resilient engagement, preferably a snap-fit engagement, with a periphery of a hole provided by the removal of a knock out segment in for example an electrical back box.

Preferably, in use the first end face of the grommet forms a resilient engagement with a periphery of a first hole provided by the removal of a first knock out segment of an item such as for example an electrical back box and the second end face of the grommet forms a resilient engagement, with a periphery of a second hole provided by the removal of a second knock out segment, of an item, such as for example an electrical back box.

Preferably the grommet is situated in use between two holes provided by the removal of two knock out segments (e.g. cylindrical knock out segments) of one or more items, such as for example electrical back boxes or panels. Preferably, in use the grommet is resiliently engaged and situated between two holes provided by the removal of two knock out segments of adjacent items, such as for example electrical back boxes or panels.

Accordingly the catchment areas (for example the washer catchment areas) provided by each of the flexible end faces of the grommet may have a diameter that corresponds with the diameter of holes provided by knock out segments or holes provided by a surface of an item. The diameter of the catchment area may be a fixed or stable diameter or one that varies in response to a force, for example one that flexes under pressure or under tension.

In preferred embodiments the grommet is constructed or formed in part or whole from a flexible material such as an elastomer, for example a rubber compound allowing flexibility at the leading edges of the flexible end faces of the grommet, in the minimum (for example one or more of the flexible end areas may be constructed or formed in part or whole from a flexible material) such that upon insertion into a hole provided by a surface, for example a hole provided by a knock out segment of an electrical box, the flexible end(s) of the grommet flex(es) sufficiently to allow entry into the aperture (which may have been provided by a knock out segment) and recovers sufficiently to engage with the edge of the aperture.

For example, one or more of the protrusions, tabs or elongate fingers of the grommet may be formed from a flexible material so as to allow the protrusion(s), tab(s) or elongate finger(s) to flex sufficiently from an initial position on insertion into a hole provided by an item to allow entry through the hole. For example, the one or more protrusions, tabs or elongate fingers may on insertion into a hole flex inwardly towards the longitudinal axis of the tubular body. The one or more protrusions, tabs or elongate fingers may then return sufficiently to the initial position, by for example extending outwardly away from the longitudinal axis of the tubular body, to secure the grommet in place with respect to the hole provided by the item.

Some embodiments of the grommet are liable to include parts which are formed from less or non-flexible materials in order to ensure a strong and secure fit between the grommet and the item to be secured. For example, the grommet may include parts formed from less or non-flexible materials in order to ensure a strong fit with for example holes provided by knock out segments of electrical boxes and to provide a solid connection between for example electrical back boxes. The tubular body and/or the catchment area(s) (for example the washer catchment areas) may be composed from less or non-flexible materials. Some embodiments of the grommet may further include one or more metal collar(s) or reinforcement between the catchment area(s), such as for example washer catchment area(s).

In preferred embodiments it is envisaged that the elongate body of the grommet extend beyond the diameter of the leading edges and catchment areas. In this way once the grommet is installed in the hole provided by for example a knock out segment of an electrical back box, the item such as for example the box is not liable to move along the body. In addition this allows for the body to be formed from the same material but with a larger diameter than the box knock out segment ensuring a thicker circumference, in turn ensuring less flexibility but with the same internal diameter allowing passage of wiring as required.

Ideally there is a flexibility in the catchment area(s), for example the washer catchment area(s) such that the grommet may be adjustable in a number of directions. Such as, for example, if two boxes are connected by at least one grommet and one box is mounted on a batten, one relatively behind another.

Because the grommets have tubular bodies, wires, pipes or other elongate members may pass efficiently and simply from box to box, through the hollow bodies of the grommets, so as that a combination or 'run' of connected boxes are liable to only require one exit knock out segment and one entrance segment into the 'run' of boxes. This minimises untidy and unnecessary wiring and also ensures that a user is able to be sure where the exit and entry points are for wiring so as to minimise the risk of an electrocution hazard in future work, for example after plasterwork has been completed.

In this way a number of boxes can be effectively connected together in order to ensure that an installer or user is enabled to attach the boxes to a batten with a reduced number of screw fixings and can be furthermore certain of spacing between the boxes being regular and formed with orthogonal lines and edges.

It is also envisaged that fascia plates or templates may be provided to further ensure effective management and finish of the connected boxes.

Typically two or more items (such as electrical back boxes or panels of a vehicle (for example an aircraft, wheeled vehicle or ship), preferably three items, more preferably four items may be connected in this way. Furthermore, during the installation of an array of items (such as for example an array of electrical back boxes or panels) at least one grommet, preferably two grommets, may be used per box side or per panel side.

The grommet may be formed by any suitable method, such as for example injection moulding. Alternatively the grommet may be cast, formed as separate pieces or machined. The grommet may be formed as an integral unit. Alternatively the grommet may comprise separate components having a mating surface at which they are joined to form the grommet. For example, the grommet may comprise at least two separate components. The at least two separate components may simply be bonded or welded along the mating surface or preferably may be provided with mutual engagement features to enable assembly to form the grommet. The mutual engagement features may resiliently engage, for example by push fit engagement, snap fit engagement or screw fit engagement, to form the grommet.

The grommet may comprise at least two parts having a mating surface aligned with any suitable plane of the grommet. For example, the grommet may comprise at least two parts having a mating surface which extends along a longitudinal plane of the grommet. Alternatively the grommet may comprise at least two parts having a mating surface which extends along a transverse plane of the grommet. For ease of manufacture the grommet may be formed from two or more identical components.

Each of the two parts may be connected to a hole provided by an item, such as for example a hole provided by a knock out section of an electrical back box, prior to the two parts being engaged together to form the grommet.

According to a further aspect of the invention there is provided a wiring system comprising a plurality of back boxes, each back box having at least one hole or knock out section to form a hole, and at least one grommet in accordance with an embodiment of the invention, in which said at least one grommet is sized to resiliently engage the periphery of the hole.

Preferred embodiments of the invention will now be described, by way of example only and with reference to the Figures, in which:

DETAILED DESCRIPTION OF PREFERRED EMBODIMENT OF THE INVENTION

Figure 1:
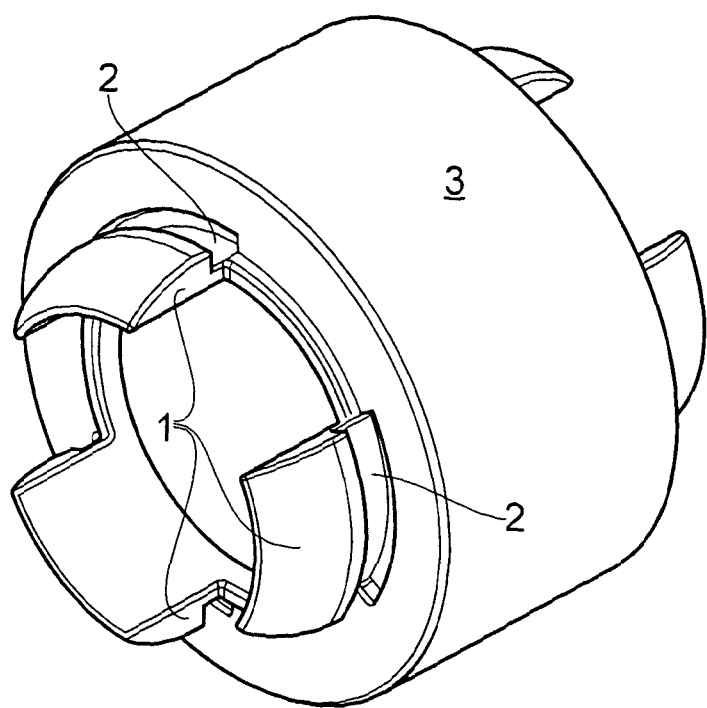
FIGS. 1 shows an isometric view of a preferred embodiment.
Figure 2:
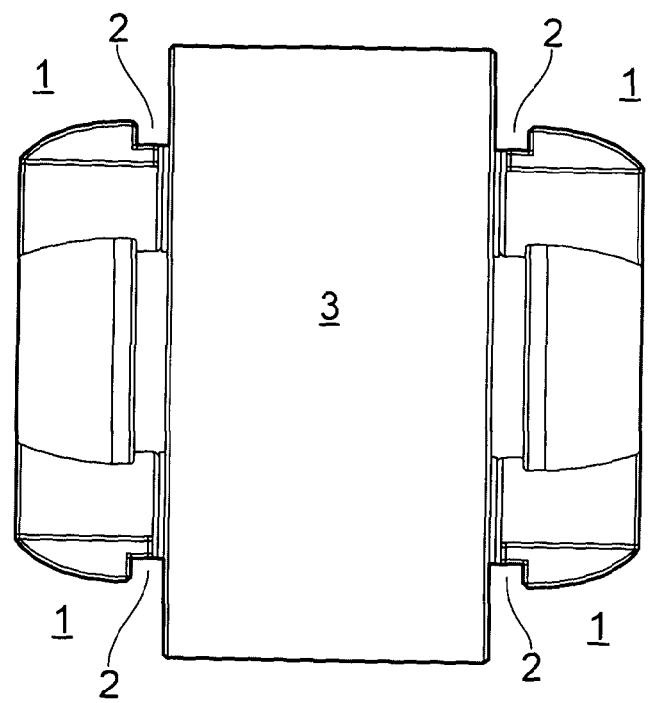
FIG. 2 shows a side view of the embodiment.
Figure 3:
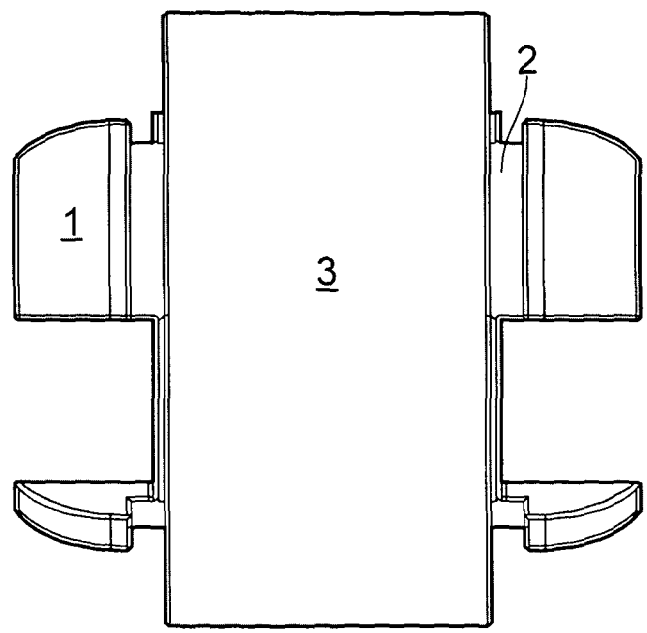
FIG. 3 shows a second side view of the embodiment.
Figure 4:
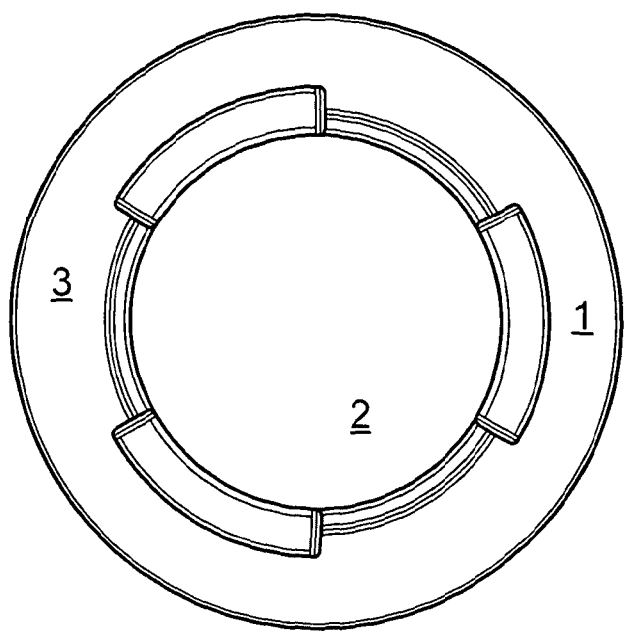
FIG. 4 shows an end view of the preferred embodiment.

The grommet is shown in a preferred embodiment whereby the leading edge is a combination of flexibly mounted tabs 1. These tabs 1 have a wedge shape to the leading edge, said leading edge preceding the washer catchment area 2.

Any number of tabs may be used to provide the leading edge and/or catchment area.

In the pictured embodiment the body of the grommet 3 is formed of a separate piece, and may in some embodiments be formed of a different material to the tabs that provide the leading edge 1 and catchment area 2. For example the body 3 may be metal, whereas the tabs are a resilient plastic.

In addition the pictured embodiment of the body 3 has a relatively large external diameter in order to prevent movement of the grommet once in place.

The catchment area 2 of the tabs is provided with a diameter that is larger than the internal diameter of the body, such that the tabs are prevented from movement within or relative to the body 3.

Figure 5:
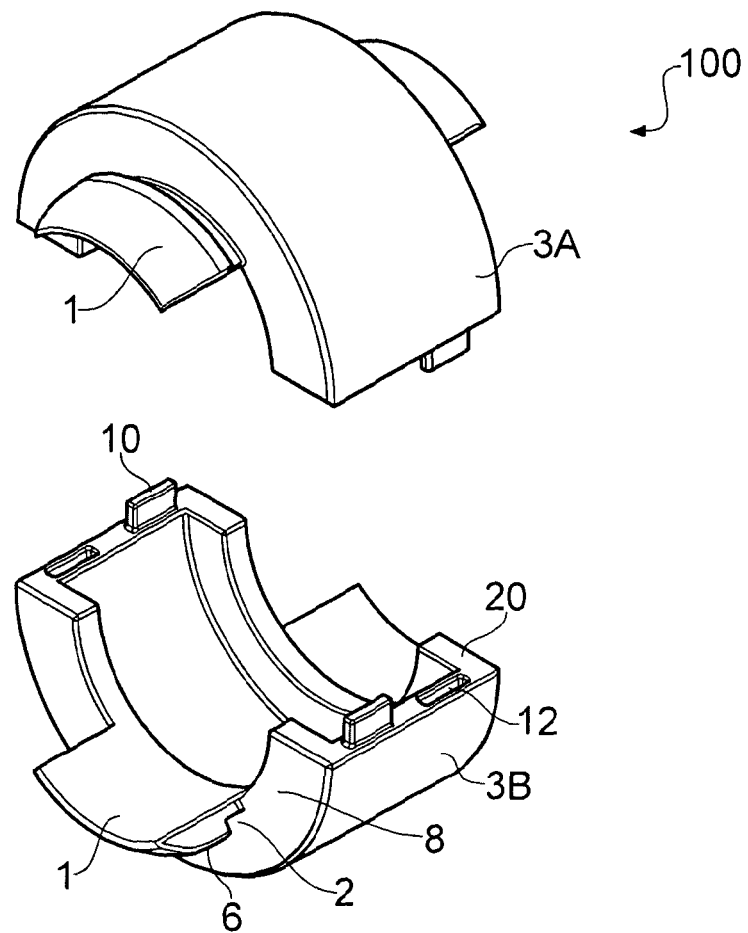
FIG. 5 shows an exploded view of a preferred embodiment of the grommet comprising two parts having a mating surface which extends along a longitudinal plane of the grommet.

FIG. 5 shows an embodiment in which the grommet 100 is formed of two separate components. Forming the grommet from two separate parts may be advantageous when forming the grommet from synthetic plastics, for example by injection moulding. The components are identical which simplifies manufacture by requiring only a single mould. The grommet is formed from electrically insulating synthetic plastics material.

Components are arranged to be assembled into the complete grommet by being joined at a mating plane which extends along a longitudinal plane of the grommet. This particular arrangement has the advantage of allowing the grommet to be assembled around an in situ wire, cable or pipe rather than requiring threading from an end. Each component comprises a body portion 3A, 3B in the form of a semi-annulus with complimentary mating surfaces 20. The mating surfaces 20 on each side of the body portion 3A, 3B are provided with a tab 10 and a recess 12 which are of complementary dimensions.

The opposite side of the same body portion 3A, 36 has a tab 10 and recess 12 that are aligned with the first side but in which the tab 10 and recess 12 are in the reverse order. This arrangement ensures that when two identical components are brought together (with one inverse relative to the other) each tab 10 is aligned with a recess 12. The tabs 10 may be an interference fit within the recesses 12 such that the grommet will remain as a single unit once assembled unless puffed apart by a user.

In this embodiment the grommet 100 is provided with a pair of opposing tabs 1 at each flexible end area. One tab is provided at each flexible end area of separate body portions 3A, 3B. Each tab comprises a thickened leading edge section 6 (which forms a protrusion) followed by a recessed catchment area 2. The thickened leading edge section 6 has a tapered profile at the distal end from the body 3 of the grommet 100 which tapers from a sharp leading edge to a maximum thickness at or near the proximal end of the leading edge portion. The thickness of the tab 1 steps down to the catchment area 2. Since the tab 1 is formed as an elongate finger extending from the body 3A, 3B and is made of a resilient flexible material it will be appreciated that the tapered portion may act to deflect the finger when the grommet 100 is inserted into a suitable hole. The resilience of the material enables the finger to "snap fit" back into position once the edge of the hole has passed the step.

The tabs 1 are formed integrally with the body 3A, 3B and are connected to the body portion at a shoulder 8. The shoulder 8 is radially aligned and provides an alignment surface which, in use, abuts the surface around a hole to which the grommet is attached. Thus the distance between the shoulders 8 at each end of the grommet 100 provide a predetermined spacing between adjacent articles (as will be explained below with respect to electrical back boxes). The longitudinal distance between the shoulders in the present embodiment is approximately 15 mm.

The catchment area 2 is defined by the section between the step change in the thickness of the tab 1 and the shoulder 8.

The longitudinal length of this catchment area 2 is dimensioned to substantially match the thickness of the material of the item that the grommet 100 is to be attached to in use. Thus the grommet 100 connects firmly to the item with a limited degree of longitudinal movement (which is determined by the choice of tolerance allowed in dimensioning).

Figure 6:
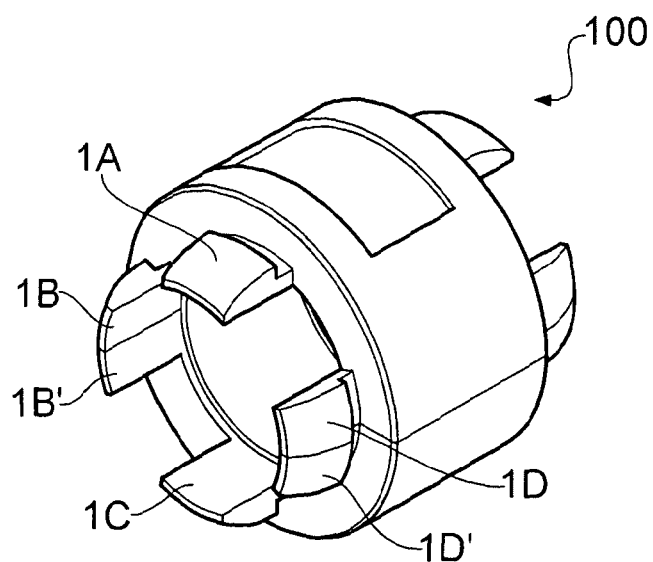
FIG. 6 shows an isometric view of another embodiment of the grommet comprising two parts having a mating surface which extends along a longitudinal plane of the grommet.

FIG. 6 shows an assembled two component grommet. This embodiment is substantially identical to that of FIG. 5 but is provided with four spaced apart tabs 1A, 1B, 1C, 1D at each flexible end area of the grommet. The tabs are arranged at each flexible end area to form two opposing pairs 1A, 1C & 1B, 1D. While the increased number of tabs may increase manufacturing complexity it may advantageously provide a more balanced gripping arrangement. Two of the tabs in this embodiment are divided by the mating plane which extends along a longitudinal plane of the grommet. Thus a tab may comprise two separate components 1D, 1D' and 1B, 1B' which form a single effective tab when the grommet is assembled.

Figure 7:
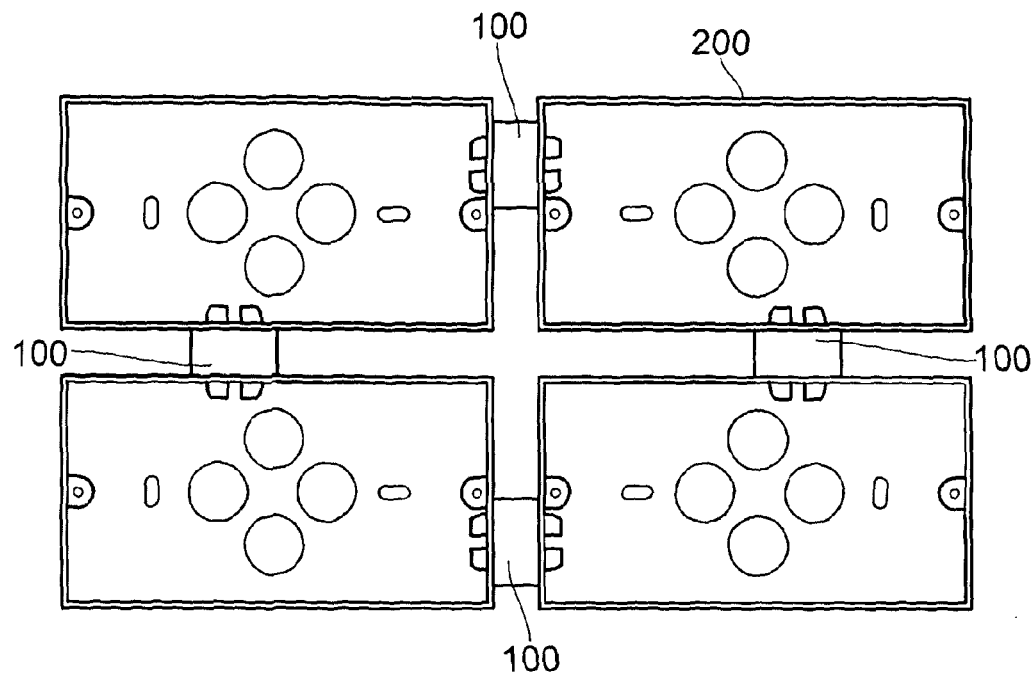
FIG. 7A shows a wiring system according to another embodiment the invention.
FIG. 7B shows the wiring system of FIG. 7A with front plates fitted.
Figure 8:
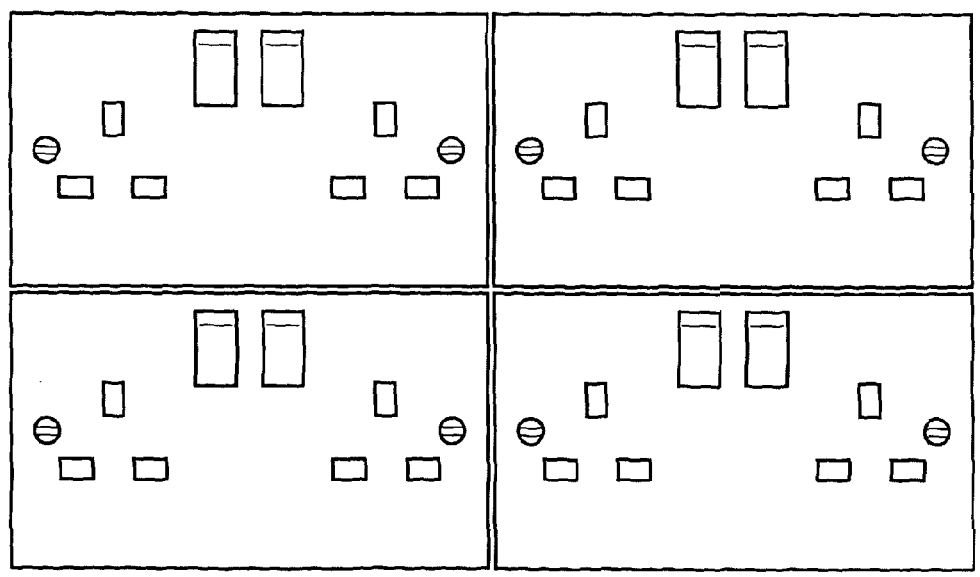

Use of the grommet according to embodiments of the invention in a wiring system will now be described with reference to FIG. 7. FIG. 7A shows the use of four grommets 100 being used to connect a set of four standard UK 2 plug electrical back boxes 200. The back boxes 200 are prepared in the conventional manner by removing knock out sections (which is achieved by simply pushing out cylindrical perforated sections using a set of pliers). A grommet 100 is then provided for each pair of holes between adjacent back boxes 200. The grommet 100 is simply pushed into the hole in each back box 200 in turn such that the tabs deflect through the hole before snap fitting into place in the hole.

The wall of the back box 200 is securely held within the catchment area of the grommet 100 such that the grommet resiliently engages the periphery of the hole. This process is repeated until the desired configuration of back boxes 200 is achieved. The grommets 100 ensure that the back boxes 200 are held in alignment with a pre-determined spacing between each box (in this case 15 mm). It may be noted that depending on the pattern of back boxes 200 that are required, that it may be desirable to utilise two parallel grommets 100 between each back box 200 to ensure that the back boxes 200 cannot twist out of alignment.

The assembled wiring system comprising a plurality of back boxes 200 and at least one grommet 100 may then be offered into position, for example in a recess within a wall or on a mounting surface. Wires may be fed into the first one of the back boxes 200 and then distributed to the other boxes via the conduit section of the grommets 100. The array of back boxes can be secured to the wall or mounting surface by a reduced number of fixation means, such as screws, for example by two screws.

After connecting the wiring to a front plate, which in the example of FIG. 7B comprises a standard double UK 3-pin socket (although other front plates may be utilised for example a switch plate), the front plates may be connected to the back boxes 200. As shown in FIG. 7B, the spacing of the back boxes 200 has been determined by the sizing of the grommet 100 such that the edges of the front plates 300 are accurately aligned and abut at their adjacent faces.

In the event that a back box 200 requires removal, the tabs of the grommet 100 may be manually pressed inwards to enable the wall of the back box 200 to pass over the step of the catchment area thereby releasing the resilient hold. The grommet may then be reused or discarded as required.

The invention has been described by way of examples only and it will be appreciated that variation may be made to the above-mentioned embodiments without departing from the scope of invention. For example, the grommet of the invention may be used to connect an item (for example an electrical back box or a panel) to a component that is provided with a complementary female mating section to engage the flexible end face of the grommet. For example the grommet may be used to attach a conduit, a flexible conduit or a flexible coupling.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Further variation may be made to the grommets in that they may be coated with or have formed thereon, an electrical conductor, so that, when inter-connecting metal items, all items are maintained at the same voltage. This feature may be particularly important when connecting metal back boxes, so that all interconnected boxes are held at the same voltage potential.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A grommet for connecting two electrical back boxes to define a conduit or passage between said two electrical back boxes, said grommet comprising:
   a hollow tubular body with a flexible end face at each end, each flexible end face having a thicker diameter leading edge section;
   a thinner diameter catchment region on each of said flexible end faces arranged to engage with a periphery of an aperture in a first one of said two electrical back boxes, such that in use said thinner diameter catchment region of a first flexible end face of said grommet forms a resilient snap-fit engagement with a periphery of an aperture in said first one of said two electrical back boxes, and said thinner diameter catchment region of a second flexible end face of said grommet forms a resilient snap-fit engagement with a periphery of an aperture in a second one of said two electrical back boxes;
   whereby said grommet separates said two electrical back boxes by a predetermined distance; and
   whereby an alignment of said aperture in said first one of said two electrical back boxes with said aperture in said second one of said two electrical back boxes defines a passage between said two electrical back boxes.

2. The grommet as claimed in claim 1, wherein:
   at least one of said flexible end faces at each end is discontinuous.

3. The grommet as claimed in claim 2, wherein said at least one of said flexible end faces comprises:
   at least one tab.

4. The grommet as claimed in claim 1, wherein said thicker diameter leading edge section comprises:
   at least one protrusion.

5. The grommet as claimed in claim 4, wherein:
   said at least one protrusion is provided on a tab.

6. The grommet as claimed in claim 4, wherein at least one of said flexible end face at each end comprises:

said at least one protrusion are spaced apart circumferentially about a longitudinal axis of said hollow tubular body.

7. The grommet as claimed in claim 6, wherein said at least one of said flexible end face at each end comprises:
two opposing pairs of protrusions.

8. The grommet as claimed in claim 6, wherein: said at least one protrusion is tapered, having a minimum thickness at an outer edge of said grommet and a maximum thickness at an inward extent of said at least one protrusion.

9. The grommet as claimed in claim 8, wherein:
a diameter of said hollow tubular body has a greater diameter than a maximum diameter of said flexible end face at each end.

10. The grommet as claimed in claim 9, wherein:
said hollow tubular body has a shoulder portion adjacent to each of said flexible end faces, said shoulder portion providing an alignment surface which is arranged, in use, to abut a surface surrounding said aperture in said respective one of said two electrical back boxes.

11. The grommet as claimed in claim 10, wherein:
a distance between said shoulder portion adjacent to each flexible end face provides a predetermined spacing between said two electrical back boxes.

12. The grommet as claimed in claim 11, wherein:
at least a part of said grommet is formed from an electrically insulating material.

13. The grommet as claimed in claim 12, wherein:
at least a part of said grommet is formed from a flexible material.

14. The grommet as claimed in claim 13, wherein said hollow tubular body comprises:
at least two separate components having a mating surface at which they join to form said hollow tubular body.

15. The grommet as claimed in claim 14, wherein said hollow tubular body comprises:
said at least two separate components having mutual engagement features for engaging with each other to form said hollow tubular body.

16. The grommet as claimed in claim 14, wherein said hollow tubular body comprises:
said at least two separate components having a mating surface which extends along a longitudinal plane of said grommet.

17. A wiring system comprising:
a plurality of back boxes, each of said plurality of back boxes having an aperture; and
at least one grommet comprising:
a hollow tubular body with a flexible end face at each end, each flexible end face having a thicker diameter leading edge section, and
a thinner diameter catchment region on each of said flexible end faces arranged to engage with a periphery of an aperture in a first one of said two electrical back boxes, such that in use said thinner diameter catchment region of a first flexible end face of said grommet forms a resilient snap-fit engagement with a periphery of an aperture in said first one of said two electrical back boxes, and said thinner diameter catchment region of a second flexible end face of said grommet forms a resilient snap-fit engagement with a periphery of an aperture in a second one of said two electrical back boxes;
wherein said at least one grommet is sized to resiliently engage a periphery of said aperture.

18. The wiring system as claimed in claim 17, wherein:
said at least one grommet is dimensioned and arranged to set a predetermined spacing between adjacent ones of said plurality of back boxes.

19. The wiring system according to claim 17, wherein:
said aperture is formed by a knock out section of said respective plurality of back boxes.

* * * * *